US009992222B2

(12) United States Patent
Stavrou et al.

(10) Patent No.: US 9,992,222 B2
(45) Date of Patent: *Jun. 5, 2018

(54) SYSTEMS AND METHODS FOR INHIBITING ATTACKS WITH A NETWORK

(71) Applicant: The Trustees of Columbia University in the City of New York, New York, NY (US)

(72) Inventors: Angelos Stavrou, New York, NY (US); Angelos D. Keromytis, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/147,441

(22) Filed: May 5, 2016

(65) Prior Publication Data

US 2016/0248808 A1 Aug. 25, 2016

Related U.S. Application Data

(60) Continuation of application No. 14/103,430, filed on Dec. 11, 2013, now Pat. No. 9,344,418, which is a
(Continued)

(51) Int. Cl.
*H04L 29/06* (2006.01)

(52) U.S. Cl.
CPC .......... *H04L 63/1458* (2013.01); *H04L 63/08* (2013.01); *H04L 63/0823* (2013.01);
(Continued)

(58) Field of Classification Search
CPC ............. H04L 63/1458; H04L 63/1416; H04L 63/123; H04L 63/0823; H04L 63/08; H04L 63/12; H04L 2463/141

See application file for complete search history.

(56) References Cited

U.S. PATENT DOCUMENTS

| | | |
|---|---|---|
| 5,455,865 A | 10/1995 | Perlman |
| 5,649,099 A | 7/1997 | Theimer et al. |

(Continued)

OTHER PUBLICATIONS

Andersen, D. G., "Mayday: Distributed Filtering for Internet Services", In Proceedings of the 4th USENIX Symposium on Internet Technologies and System (USITS '03), Seattle, WA, USA, Mar. 26-28, 2003, pp. 31-42.
(Continued)

*Primary Examiner* — Darren B Schwartz
(74) *Attorney, Agent, or Firm* — Byrne Poh LLP (57) ABSTRACT

Systems and methods for inhibiting attacks with a network are provided. In some embodiments, methods for inhibiting attacks by forwarding packets through a plurality of intermediate nodes when being transmitted from a source node to a destination node are provided, the methods comprising: receiving a packet at one of the plurality of intermediate nodes; determining at the selected intermediate node whether the packet has been sent to the correct one of the plurality of intermediate nodes based on a pseudo random function; and forwarding the packet to the destination node, based on the determining. In some embodiments an intermediate node is selected based on a pseudo random function. In some embodiments, systems and methods for establishing access to a multi-path network are provided.

18 Claims, 7 Drawing Sheets

Related U.S. Application Data division of application No. 12/048,533, filed on Mar. 14, 2008, now Pat. No. 8,631,484, which is a continuation of application No. PCT/US2006/036327, filed on Sep. 18, 2006.

(60) Provisional application No. 60/717,716, filed on Sep. 16, 2005.

(52) U.S. Cl.
CPC ........ *H04L 63/123* (2013.01); *H04L 63/1416* (2013.01); *H04L 63/12* (2013.01); *H04L 2463/141* (2013.01)

(56) References Cited

U.S. PATENT DOCUMENTS

| | | | |
|---|---|---|---|
| 5,842,040 | A | 11/1998 | Hughes et al. |
| 6,009,173 | A | 12/1999 | Sumner |
| 6,032,258 | A | 2/2000 | Godoroja et al. |
| 6,092,191 | A | 7/2000 | Shimbo et al. |
| 6,111,877 | A | 8/2000 | Wilford et al. |
| 6,330,610 | B1 | 12/2001 | Docter et al. |
| 6,425,004 | B1 | 7/2002 | Hardjono |
| 6,725,376 | B1 | 4/2004 | Sasmazel et al. |
| 7,120,792 | B1 | 10/2006 | Jacobson et al. |
| 7,500,264 | B1 | 3/2009 | Leavy et al. |
| 2002/0097724 | A1 | 7/2002 | Halme et al. |
| 2002/0150043 | A1 | 10/2002 | Perlman et al. |
| 2002/0150253 | A1 | 10/2002 | Brezak et al. |
| 2002/0161884 | A1 | 10/2002 | Munger et al. |
| 2003/0163569 | A1 | 8/2003 | Panasyuk et al. |
| 2003/0177381 | A1 | 9/2003 | Ofek et al. |
| 2003/0188193 | A1 | 10/2003 | Venkataramappa |
| 2005/0038905 | A1 | 2/2005 | Banes et al. |
| 2005/0108576 | A1 | 5/2005 | Munshi |
| 2005/0188073 | A1 | 8/2005 | Nakamichi et al. |
| 2006/0064458 | A1 | 3/2006 | Gehrmann |
| 2006/0174110 | A1 | 8/2006 | Strom et al. |
| 2008/0310375 | A1 | 12/2008 | Akram et al. |

OTHER PUBLICATIONS

Andersen, D. G., et al., "Best-Path vs. Multi-Path Overlay Routing", In Proceedings of the Internet Measurement Conference, Miami, FL, USA, Oct. 27-29, 2003, pp. 91-100.
Andersen, D. G., et al., "Improving Web Availability for Clients with MONET", In Proceedings of the 2nd Symposium on Networked Systems Design and Implementation (NSDI), Boston, MA, USA, May 2005, pp. 115-128.
Anderson, T., et al., "Preventing Internet Denial-of-Service with Capabilities", In Proceedings of the 2nd Workshop on Hot Topics Networks (HotNets-II), Cambridge, MA, USA, Nov. 20-21, 2003, pp. 39-44.
Bailey, M., et al., "The Internet Motion Sensor: A Distributed Blackhole Monitoring System", In Proceedings of the 12th Annual Network and Distributed System Security Symposium (NDSS '05), San Diego, CA, USA, Feb. 2005, pp. 167-179.
Black, J., et al., "UMAC: Fast and Secure Messsage Authentication", Lecture Notes in Computer Science, Advances in Cryptology—CRYPTO' 99, vol. 1666, Dec. 1999, pp. 216-233.
Diament, T., et al., "The Dual Receiver Cryptogram and Its Applications", In Proceedings of the 11th ACM Conference on Computer and Communications Security (CCS '04), Washington, DC, USA, Oct. 25-29, 2004, pp. 330-343.
Dingledine, R., et al., "Tor: The Second-Generation Onion Router", In Proceedings of the 13th USENIX Security Symposium, San Diego, CA, USA, Aug. 9-13, 2004, pp. 1-18.
Estrin, D., et al., "VISA Protocols for Controlling Inter-Organizational Datagram Flow", Technical Report, WRL Research Report 88/5, Dec. 1988, pp. 1-33.
Gligor, V.D., "Guaranteeing Access in Spite of Distributed Service-Flooding Attacks", In Proceedings of the 11th International Workshop on Security Protocols, Cambridge, UK, Apr. 2-4, 2003, pp. 80-96.
Gummadi, K.P., et al., "Improving the Reliability of Internet Paths with One-Hop Source Routing", In Proceedings of the 6th Symposium on Operating Systems Design & Implementation, San Francisco, CA, USA, Dec. 6-8, 2004, pp. 13-13.
International Preliminary Report on Patentability dated Mar. 27, 2008 in International Patent Application No. PCT/US2006/036327.
International Search Report and Written Opinion dated Sep. 7, 2007 in International Patent Application No. PCT/US2006/036327.
International Search Report dated Feb. 18, 2004 in International Patent Application No. PCT/US2003/004535.
Ioannidis, J., et al., "Implementing Push-Back: Router-Based Defense Against DDoS Attacks", In Proceedings of the 9th Annual Symposium on Network and Distributed System Security (NDSS '02), San Diego, CA, USA, Feb. 2002, pp. 1-8.
Jakobsson, M., et al., "Proofs of Work and Bread Pudding Protocols", In Proceedings of the IFIP TC6 & TC11 Joint Working Conference on Communications and Multimedia Security, Leuven, BE Sep. 20-21, 1999, pp. 258-272.
Kandula, S., et al., "Botz-4-Sale: Surviving Organized DDoS Attacks That Mimic Flash Crowds", In Proceedings of the 2nd Symposium on Networked Systems Design and Implementation (NSDI), Boston, MA, USA, May 2-4, 2005, pp. 287-300.
Keromytis, A.D., et al., "SOS: An Architecture for Mitigating DDoS Attack", In IEEE Journal on Selected Areas of Communications (JSAC), vol. 22, No. 1, Jan. 2004, pp. 176-188.
Keromytis, A.D., et al., "The Design of the OpenBSD Cryptographic Framework", In Proceedings of the 2003 USENIX Annual Technical Conference, San Antonio, TX, USA, Jun. 9-14, 2003, pp. 181-196.
Kohler, E., et al., "The Click Modular Router", In ACM Transactions on Computer Systems (TOCS), vol. 18, No. 3, Aug. 2000, pp. 263-297.
Kuzmanovic, A., et al., "Low-Rate TCP-Targeted Denial of Service Attacks", In Proceedings of the 2003 Conference on Applications, Technologies, Architectures, and Protocols for Computer Communication (SIGCOMM '03), Karlsruhe, DE, Aug. 25-29, 2003, pp. 75-86.
Moore, D., et al., "Inferring Internet Denial-of-Service Activity", In Proceedings of the 10th USENIX Security Symposium, Washington, DC, USA, Aug. 13-17, 2001, pp. 9-22.
Morein, W.G., et al., "Using Graphic Turing Tests to Counter Automated DDoS Attacks Against Web Servers", In Proceedings of the 10th ACM Conference on Computer and Communications Security (CCS '03), Washington, DC, USA, Oct. 27-30, 2003, pp. 8-19.
Nahum, E.M., et al., "The Effects of Wide-Area Conditions on WWW Server Performance", In Proceedings of the Joint International Conference on Measurements and Modeling of Computer Systems (SIGMETRICS '01), Cambridge, MA, USA, Jun. 16-20, 2001, pp. 257-267.
Office Action dated Jan. 17, 2012 in U.S. Appl. No. 12/048,533.
Office Action dated Feb. 25, 2013 in U.S. Appl. No. 12/048,533.
Office Action dated Apr. 23, 2015 in U.S. Appl. No. 14/103,430.
Office Action dated Jun. 27, 2011 in U.S. Appl. No. 12/048,533.
Office Action dated Aug. 22, 2012 in U.S. Appl. No. 12/048,533.
Stavrou, A., et al., "MOVE: An End-to-End Solution to Network Denial of Service", In Proceedings of the 12th Annual Network and Distributed System Security Symposium (NDSS '05), San Diego, CA, USA, Feb. 2-4, 2005, pp. 81-96.
U.S. Appl. No. 60/365,976, filed Feb. 14, 2002.
Von Ahn, L., et al., "CAPTCHA: Using Hard AI Problems for Security", In Proceedings of the 22nd International Conference on Theory and Applications of Cryptographic Techniques (EUROCRYPT '03), Warsaw, PL, May 4-8, 2003, pp. 294-311.
Wang, J., et al., "Empirical Study of Tolerating Denial-of-Service Attacks with a Proxy Network", In Proceedings of the 14th USENIX Security Symposium, Baltimore, MD, USA, Jul. 31-Aug. 5, 2005, pp. 51-64.

(56) References Cited

OTHER PUBLICATIONS

Xuan, D., et al., "Analyzing the Secure Overlay Services Architecture Under Intelligent DDoS Attacks", In Proceedings of the 24th International Conference on Distributed Computing Systems (ICDCS '04), Tokyo, JP, Mar. 24-26, 2004, pp. 408-417.

Yaar, A., et al., "Pi: A Path Identification Mechanism to Defend Against DDoS Attacks", In Proceedings of the IEEE Symposium on Security and Privacy (S&P '03), May 11-14, 2003, pp. 93-107.

Yaar, A., et al., "SIFF: A Stateless Internet Flow Filter to Mitigate DDoS Flooding Attacks", In Proceedings of the IEEE Symposium on Security and Privacy (S&P '04), Berkeley, CA, USA, May 9-12, 2004, pp. 130-143.

SYSTEMS AND METHODS FOR INHIBITING ATTACKS WITH A NETWORK

CROSS-REFERENCE TO RELATED APPLICATIONS

This application is a continuation of U.S. patent application Ser. No. 14/103,430, filed Dec. 11, 2013, which is a divisional of U.S. patent application Ser. No. 12/048,533, filed Mar. 14, 2008, which is a continuation of International Patent Application No. PCT/US2006/036327, filed Sep. 18, 2006, which claims the benefit of U.S. Patent Application No. 60/717,716, filed Sep. 16, 2005, each of which is hereby incorporated by reference herein in its entirety.

STATEMENT REGARDING FEDERALLY SPONSORED RESEARCH OR DEVELOPMENT

This invention was made with government support under Award No. 0426623 awarded by the National Science Foundation. The government has certain rights in the invention.

TECHNICAL FIELD

The disclosed subject matter relates to systems and methods for inhibiting attacks with a network.

BACKGROUND

Communications between digital processing devices can be inhibited by attacks upon the digital devices themselves or a network that the devices use for communication. One type of attack, a denial-of-service (DoS) attack, can make a resource unavailable to users by overloading the resource with traffic or requests. For example, a DoS attack can target a web-server so that the web-server cannot serve web pages. A DoS attack can also flood a network with traffic so that the network is too busy to serve legitimate traffic.

One goal in combating a DoS attack is to distinguish between authorized and unauthorized traffic. Authorized traffic is allowed to reach its target, while unauthorized traffic is dropped, rate-limited, or otherwise not allowed to successfully reach its target. One method of preventing some DoS attacks is to use a network to act as a first-level firewall that discriminates between legitimate traffic and potentially malicious traffic. A client can route its traffic through a node in the network and onto its intended target (e.g., a web-server), which is at a location unknown to the client and to possible attackers. Because the location of the target is unknown, it is more difficult for attackers to inhibit communications with the target.

Prior systems depend on the inability of an attacker to discover connectivity information for a given client and the infrastructure used by that client (e.g., which node a client is using to route traffic). This makes prior systems susceptible to a variety of attacks. For example, attackers can possess real-time knowledge of the specific node a client is routing traffic through, or can attack nodes using a time-based scheme that tries to increase the impact of the attack on clients' connectivity.

In targeted attacks, for example, an attacker that has knowledge of a client's communication parameters can follow the client's connections and bring down the nodes that the client tries to connect to. As soon as the client realizes that the node is unresponsive and switches to a new node, the attacker can direct the attack to this new node. Thus, an attacker that can bring down a single node can create a targeted-DoS attack for specific clients.

Other attacks can exploit information that was intended only to be available to trusted components of the system, but which an attacker can feasibly gain access to, are also possible against prior systems. For example, in sweeping attacks the attacker can use its power to attack a small percentage of the nodes of a network at a time. This type of attack can target an application-level state (e.g., application information used for determining a future action) maintained by the node responsible for a client. Destroying this state can force the client to reestablish both network and application-level connectivity, can degrade the client's connection and can lead to DoS for time-critical or latency-dependent applications. Thus, although network firewalls can help in inhibiting some attacks, they remain vulnerable to a range of debilitating attacks.

Additional DoS attacks, such as exhaustion attacks (e.g., CPU-exhaustion and memory-exhaustion attacks) and IP-spoofing attacks can also successfully attack prior systems. In exhaustion attacks an attacker can overload and, thus, exhaust, a component of a system so that it cannot function. In an IP-spoofing attack, an attacker can gain unauthorized access to a computer or a network by making it appear that a message has come from a trusted machine.

Accordingly, it is desirable to provide systems and methods for inhibiting attacks with a multi-path network.

SUMMARY

Systems and methods for inhibiting attacks with a network are provided. In some embodiments, methods for inhibiting attacks by forwarding packets through a plurality of intermediate nodes when being transmitted from a source node to a destination node are provided, the methods comprising: receiving a packet at one of the plurality of intermediate nodes; determining at the selected intermediate node whether the packet has been sent to the correct one of the plurality of intermediate nodes based on a pseudo random function; and forwarding the packet to the destination node, based on the determining.

In some embodiments, methods for inhibiting attacks by forwarding packets through a plurality of intermediate nodes when being transmitted from a source node to a destination node are provided, the methods comprising: receiving security information at the source node from at least one of the plurality of intermediate nodes; selecting an intermediate node among the plurality of intermediate nodes based on a pseudo-random function; and sending a packet and the security information to the selected intermediate node.

In some embodiments, devices that inhibit attacks by forwarding packets, when being transmitted from a source node to a destination node are provided, the devices each comprising: an interface in communication with a network; a memory in communication with the interface; and a processor in communication with the memory and the interface; wherein the processor: receives a packet; determines whether the packet has been sent to the correct device based on a pseudo random function; and forwards the packet to the destination node, based on the determining.

In some embodiments, devices that inhibit attacks when packets are being transmitted through a plurality of intermediate nodes to a destination node are provided, the devices each comprising: an interface in communication with the network; a memory in communication with the interface; and a processor in communication with the memory and the interface; wherein the processor: receives security information from at least one of the plurality of intermediate nodes; selects an intermediate node among the plurality of intermediate nodes based on a pseudo-random function; and sends a packet and the security information to the selected intermediate node.

In some embodiments, computer-readable mediums containing computer-executable instructions are provided that, when executed by a processor, cause the processor to perform methods for inhibiting attacks by forwarding packets through a plurality of intermediate nodes when being transmitted from a source node to a destination node, the methods comprising: receiving a packet at an intermediate node selected among the plurality of intermediate nodes; determining at the selected intermediate node whether the packet is authorized to be accepted at the selected intermediate node; and forwarding the packet to the destination node, based on the determining.

In some embodiments, computer-readable mediums containing computer-executable instructions that, when executed by a processor, cause the processor to perform methods for inhibiting attacks by forwarding packets through a plurality of intermediate nodes when being transmitted from a source node to a destination node are provided, the methods comprising: receiving security information at the source node from at least one of the plurality of intermediate nodes; selecting an intermediate node among the plurality of intermediate nodes based on a pseudo-random function; and sending a packet and the security information to the selected intermediate node.

In some embodiments, systems and methods for establishing access to a multi-path network are provided, the methods comprising: receiving a request from a client for access to the network at a first node among at least two nodes in the network; selecting a second node among the at least two nodes in the network; forwarding the request to the second node; generating a token, based at least in part on the request; and sending the token to the client.

In some embodiments, systems and methods for establishing access to a multi-path network are provided, the methods comprising: receiving a first request from a client for access to the network at a first node among at least four nodes in the network; selecting a second node among the at least four nodes in the network; forwarding the first request to the second node; creating an initial token; forwarding the initial token to the client; receiving from the client at least the initial token and a second request at a third node among the at least four nodes in the network; determining at the third node whether the initial token is valid; selecting a fourth node among the at least four nodes in the network; forwarding the second request and the initial ticket to the fourth node;

DETAILED DESCRIPTION

Systems and methods for inhibiting denial-of-service attacks with a multi-path network are disclosed. Using some embodiments of the disclosed subject matter, a network can issue a token to a client and this token can be used to verify the authenticity of packets communicated to the network by the client. The use of the token can reduce the necessity to maintain application and/or network-level state at the nodes or elsewhere in the network. A client can spread its packets across nodes in the network and inhibit an attacker from following the sequence with which the packets are spread. The disclosed subject matter can provide protection from attacks, for example, protection from attacks that use state dependence to attack the network and protection from attacks on only part of a network.

Some embodiments of the disclosed subject matter provide a firewall in a network such that access links to the network do not become congested. This firewall can perform access control using any appropriate system or method, such as, for example, IP security, transport layer security (TLS), or access control protocols as described below. Authorized traffic can be routed to a secret location, which can be the destination of the traffic itself or a device (e.g., a server) that can contact and communicate with the destination. It should be noted that it is possible for the location of the destination itself, and/or a server that can contact the destination, to vary over time.

In some embodiments, systems and methods according to the disclosed subject matter can provide protection for the communications of a client of a network from attackers that have either, for example, partial knowledge of the communications parameters (e.g., can determine which nodes of a network a client is communicating with) or are attacking nodes of network using sweeping attacks. Systems and method can be configured so that a client is required to spread packets across nodes in a pseudo-random manner and perform this spreading without storing network or application level state in the nodes or elsewhere in the network. This can prevent an attacker from being able to mount a DoS attack against those nodes because the attacker is unsure of which nodes to attack. If an attacker does attack, randomly or otherwise, a subset of the nodes, this would not be successful against every node and therefore only result in a fraction of the client's traffic being dropped. The effects of these packets being dropped can be reduced or eliminated by, for example, using forward error correction (FEC) or duplication of packets (e.g., sending the same packet through different nodes). Additionally, a protocol, such as TCP, can be depended on to simply resend any dropped packets.

Figure 1:
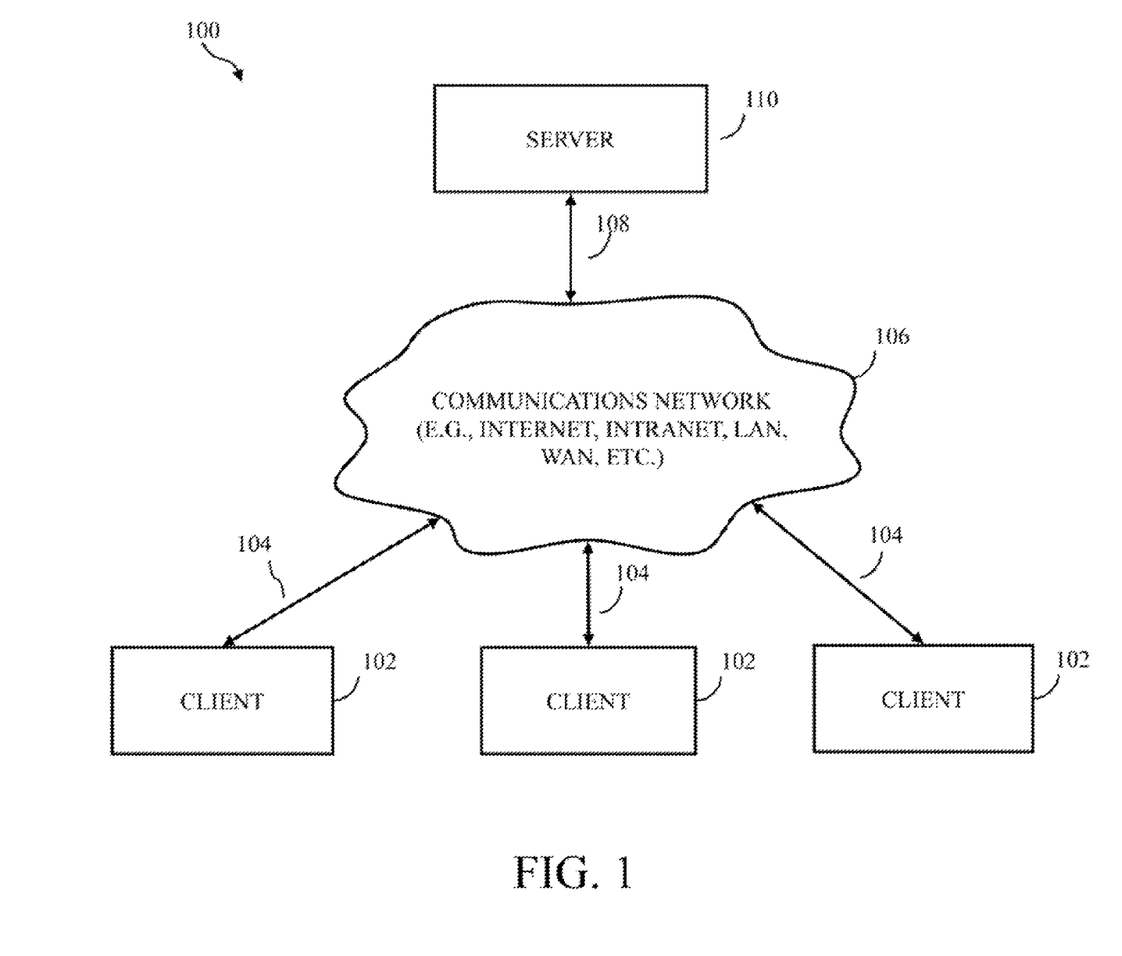
FIG. 1 is a schematic diagram of an illustrative system suitable for implementation of an application that protects applications from attacks in accordance with some embodiments of the disclosed subject matter.

FIG. 1 is a schematic diagram of an illustrative system 100 suitable for implementation of systems and methods for protecting an application from attack in accordance with some embodiments of the disclosed subject matter. As illustrated, system 100 can include one or more clients 102. Clients 102 can be local to each other or remote from each other, and can be connected by one or more communications links 104 to a communications network 106. Communications network 106 can also be linked through a communications link 108 to a server 110. Various embodiments of the disclosed subject matter can be implemented on at least one of the server and the clients. It is also possible that a client and a server can be connected through communication links 108 or 104 directly and not through a communication network 106.

In system 100, server 110 can be any suitable server or digital processing device for executing an application, such as, for example, a processor, a computer, a data processing device, or a combination of such devices. Communications network 106 can be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 104 and 108 can be any communications links suitable for communicating data between clients 102 and server 110, such as network links, dial-up links, wireless links, hard-wired links, etc. Clients 102 can be any suitable digital processing devices, such as, for example, personal computers, laptop computers, mainframe computers, dumb terminals, data displays, Internet browsers, personal digital assistants (PDAs), two-way pagers, wireless terminals, portable telephones, etc., or any combination of the same. Clients 102 and server 110 can be located at any suitable location. In one embodiment, clients 102 and server 110 can be located within an organization. Alternatively, clients 102 and server 110 can be distributed between multiple organizations.

Figure 2:
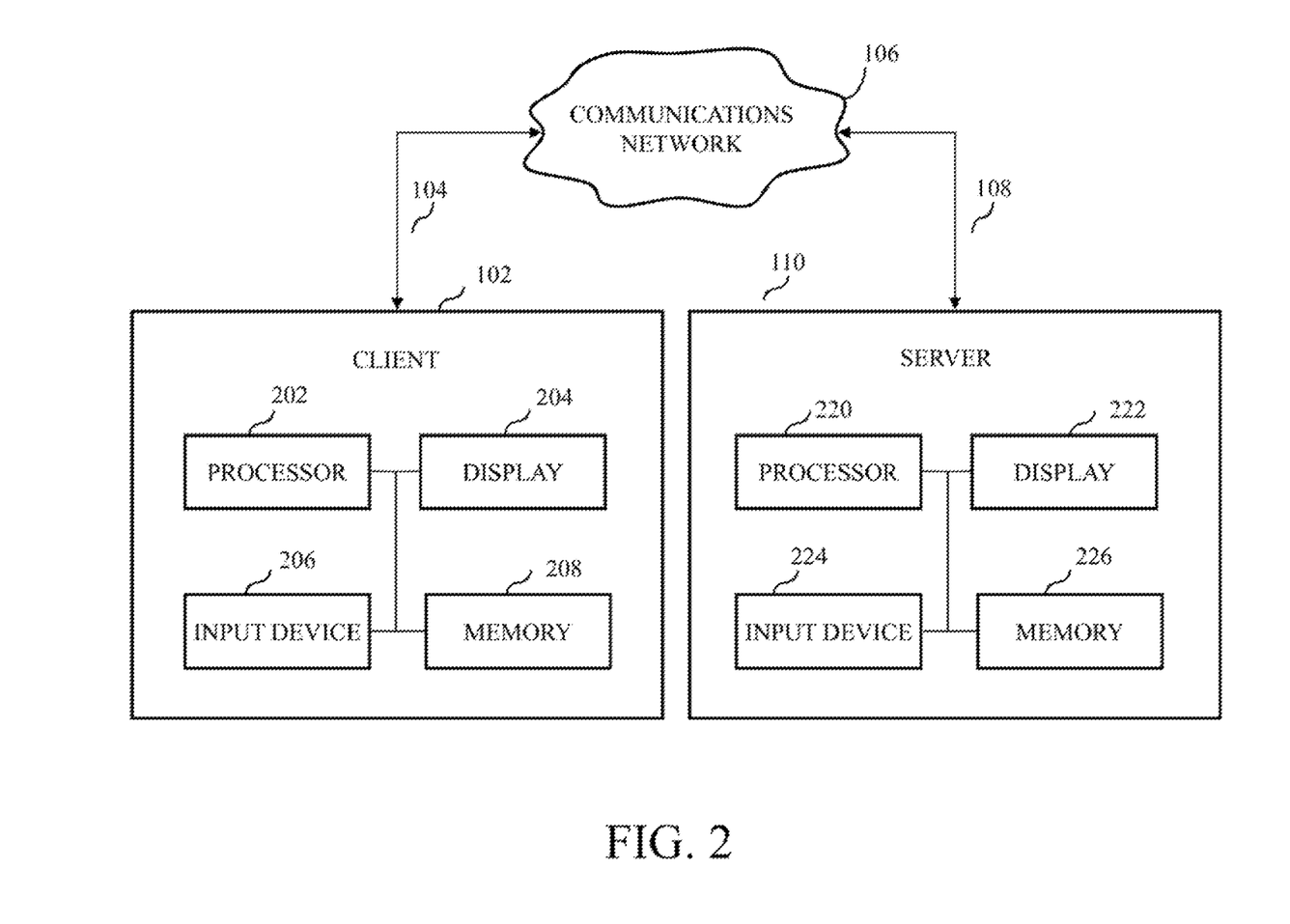
FIG. 2 is a detailed example of the server and one of the clients of FIG. 1 that can be used in accordance with some embodiments of the disclosed subject matter.

The server and one of the clients, which are depicted in FIG. 1, are illustrated in more detail in FIG. 2. Referring to FIG. 2, client 102 and server 110 can include respectively, among other things, processors 202 and 220, displays 204 and 222, input devices 206 and 224, and memory 208 and 226, which can be interconnected. In one embodiment, memory 208 and 226 contain a storage device for storing a program for controlling processors 202 and 220. Memory 208 and 226 can also contain applications for protecting at least one other application from attacks. In some embodiments, various applications can be resident in the memory of client 102 or server 110. It should be noted that variations and combinations of system 100 might be suitable for different embodiments of the disclosed subject matter. In addition, although the methods and systems of the subject matter are described herein as being implemented on a client and/or a server, this is only illustrative. Various components of embodiments of the disclosed subject matter can be implemented on any suitable platform.

Figure 3:
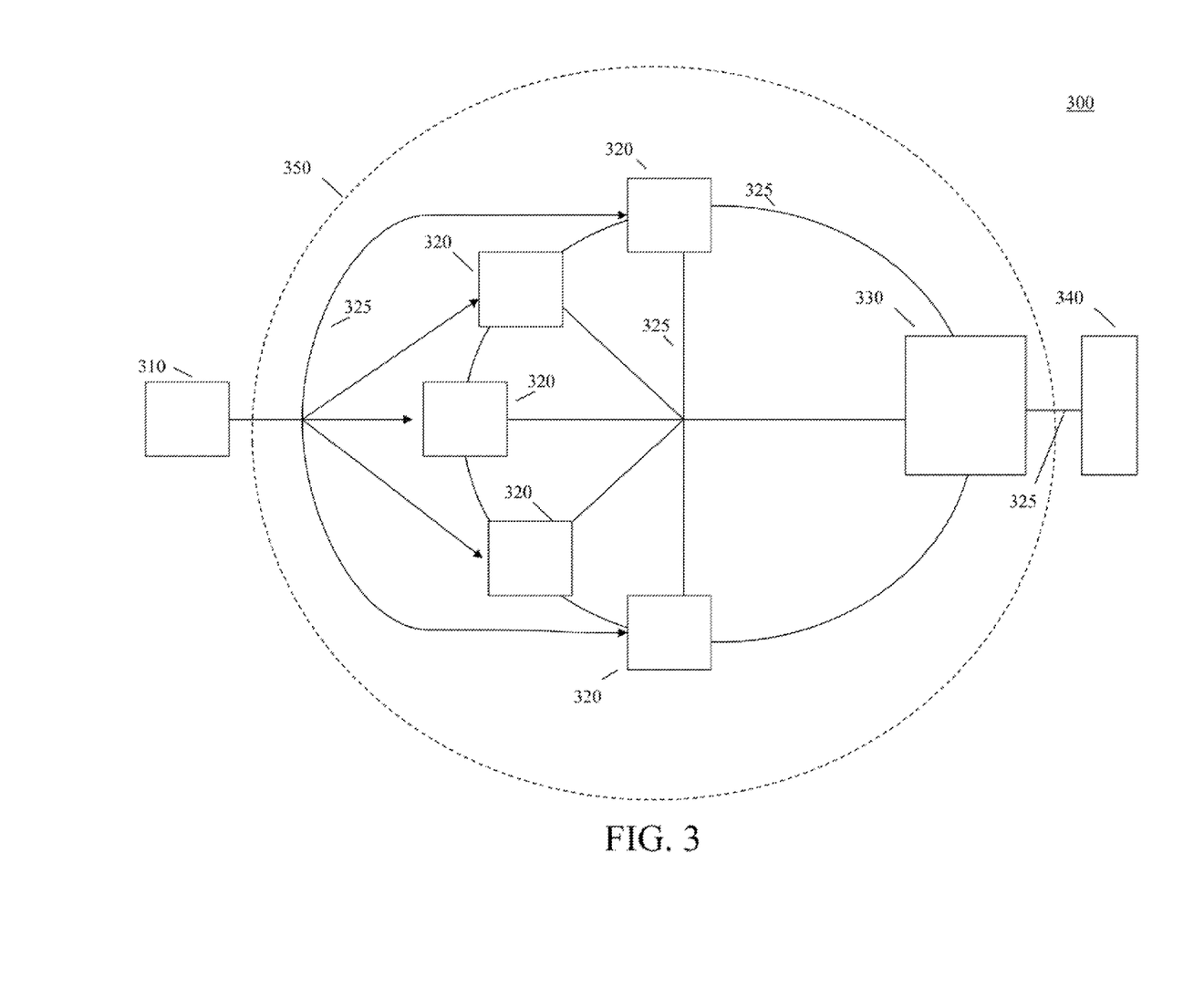
FIG. 3 is a simplified illustration of a system suitable for inhibiting attacks on digital devices using a multi-path network in accordance with some embodiments of the disclosed subject matter.

System 300 of FIG. 3 illustrates an embodiment of a system suitable for providing protection from DoS attacks that attempt to, for example, inhibit communication between a client 310 and a server 340. Communication between a client 310 and server 340 can be through a network 350 that can contain nodes 320 and possibly a server 330. One possible implementation of a system 300 can be a client 310 embodied on a client 102 of FIG. 1 and nodes 320, server 330, and server 340 embodied on various servers 110. However, some embodiments of system 300 can include any of client 310, nodes 320, server 330, and server 340 implemented on any of a client 102 and/or server 110. Communication links 325 can be embodied as communication links 104 and/or 108, and/or network 106. In various embodiments, system 300 can be embodied as an overlay network on a system 100 and in such an embodiment, nodes 320 can be, for example, overlay nodes. In some embodiments using, for example, overlays, as described above, it is possible to embody the network of FIG. 3 on a network of FIG. 1 without requiring changes to the network of FIG. 1. It should be noted that in some embodiments, nodes 320 and/or server 330 are not user machines, but are hosts dedicated to offering a protection service. It should also be noted that many clients 310, servers 330, and/or servers 340 can be connected to a network 350 and that only one of each is shown simply for ease of explanation.

Some embodiments can be used to inhibit attacks with a network 350 by forwarding, from a plurality of nodes 320, packets being transmitted from a client 310 to a server 340 or packets being transmitted from a server 340 to a client 310. In some embodiments, nodes 320 can be embodied as intermediate nodes, a client 310 can be embodied as a source node, server 330 can be embodied as a further intermediate node, and a server 340 can be embodied as a destination node. It should be noted that, in some embodiments, a source node can be embodied on, for example, a server 110 or a client 102, intermediate nodes can be embodied on a clients 102 or servers 110, and a destination node can be embodied on a server 110 or client 102. Additionally, the roles of, for example, a source node and a destination node can change. For example, a source node can sometimes be a destination node, and a destination node can sometimes be a source node.

As discussed above, systems and methods according to the disclosed subject matter can issue a token to a client 310. This token can be used by a node 320 to authenticate the client 310, to validate routing decisions, and to prevent malicious or subverted nodes from utilizing a disproportionate or undesired amount of bandwidth. Although any appropriate authentication protocol can be used, many protocols require at least two round-trips between the parties and often require considerable computation. One consideration in selecting a protocol is that an attacker that can observe communications between a client 310 and the network 350 can direct an attack, for example, a congestion-based DoS attack, against a node 320 that is contacted by a client 310 for authentication purposes. This can prevent the client 310 from successfully completing an authentication process.

In some embodiments, systems and methods according to the disclosed subject matter, can overcome this issue by redirecting the authentication request from, for example, one node 320 to another node 320. To accomplish this, a client 310 can select a node 320, such as node 401 of FIG. 4, and send, at 410, node 401 a packet 510 of FIG. 5 for example, containing for example, the client's public key certificate 512, the clients IP address 511, and other information. Upon receiving the request, the receiving node 401 can forward, at 411, the packet to a second node 320, such as node 402. Therefore, if an attacker is able to follow the communication 410 and attack node 401, this will not stop the authentication process because node 401 is no longer needed to complete the authentication. Eventually, the authentication can be complete and a token, such as, for example packet 530, can be provided to client 310, at 412, that can allow the client 310 to access the network 350. It should be noted that the selection of the nodes 401 and 402 can be made randomly or by any other suitable method.

Protocols to negotiate security information, such as a token, which in some embodiments can be a key and a ticket, are described below. It should be noted, however, that any appropriate protocol can be used and that various changes can be made to the formats of, for example, the security information, token, packets, ticket, key, IP address, flags, and/or sequence number described herein and illustrated in FIG. 5. It should also be noted that the use of IP packets is only illustrative and that any appropriate packet type can be used, such as, for example, Internet Protocol version 4 packets, Internet Protocol version 6 packets, and User Data Gram packets. Upon completion of such a protocol, the ticket 520, for example, can be used by a client 310 to access the network 350. In some embodiments, a ticket can be security information that provides a client access to a network, and/or to part of a network, and/or indicates that a packet associated with the ticket came from a certain client.

Figure 5:
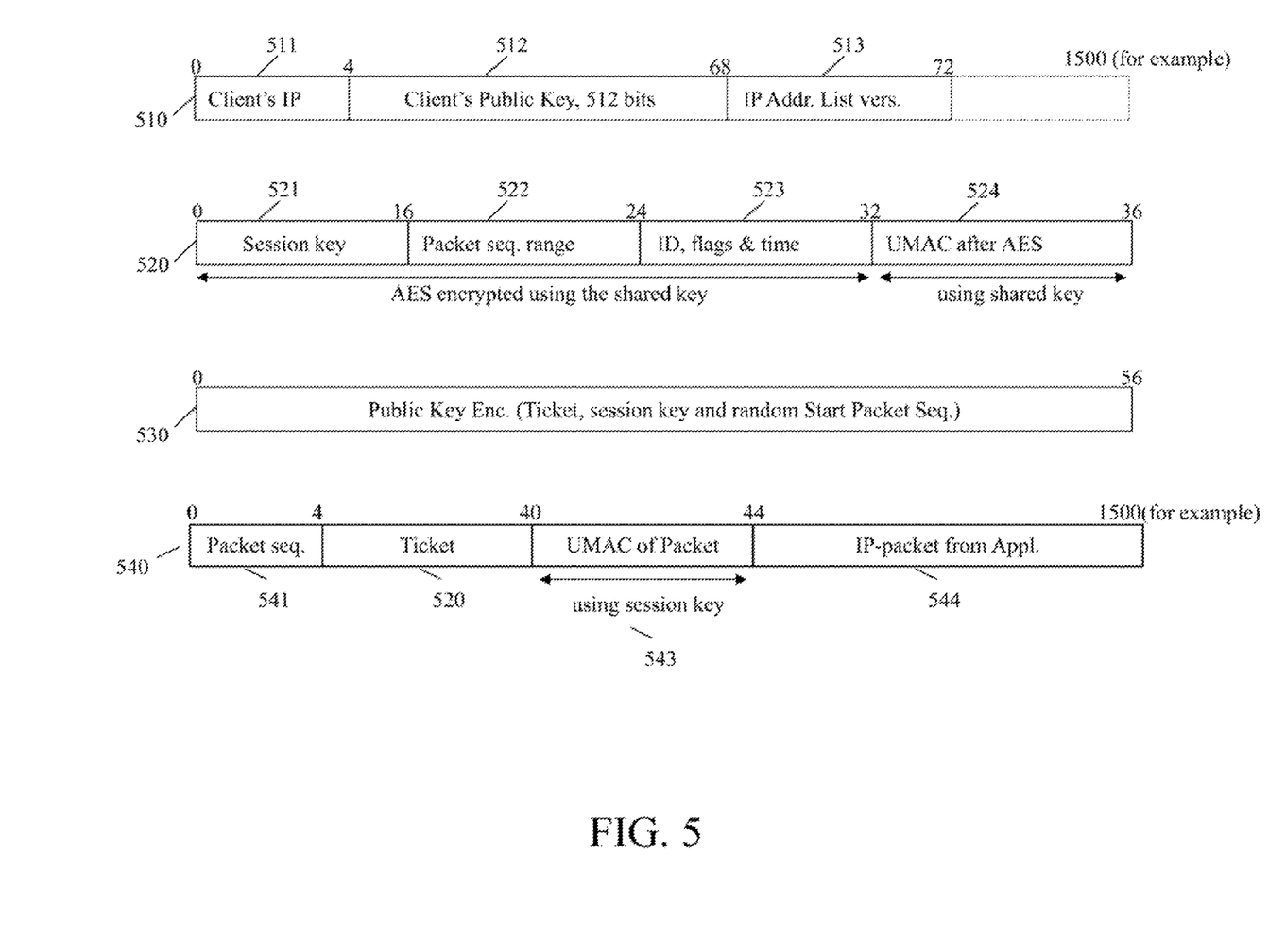
FIG. 5 is a simplified illustration of some example packet formats and an example ticket format that can be used in some embodiments of the disclosed subject matter.

However, it should be noted that a ticket can be any appropriate form of security information. Ticket 520 can contain, for example, a session key, Ku 521, a range of packet sequence numbers 522 for which Ku 521 and the ticket 520 are valid, a randomly selected client identifier, the current time-stamp, and a flag indicating that the authorization is not complete, all shown at 523. It is also possible that, for example, the session key, Ku, can be received separately from the ticket. The client identifier can be a random value and can be selected by a node 320 that authenticated that client 310. Each of these parts of the ticket can be encrypted and authenticated under KM, a secret key that can be negotiated periodically (e.g., every few hours) among the nodes 320. The ticket can also include be a message authentication code 524 based on, for example, a universal hashing (UMAC) signature of the encrypted ticket using KM and a nonce (i.e., a number used once), which can consist of, for example, the first 64 bits of the encrypted ticket. It should be noted that, in some embodiments, only nodes 320 can validate and decrypt the ticket.

Figure 4:
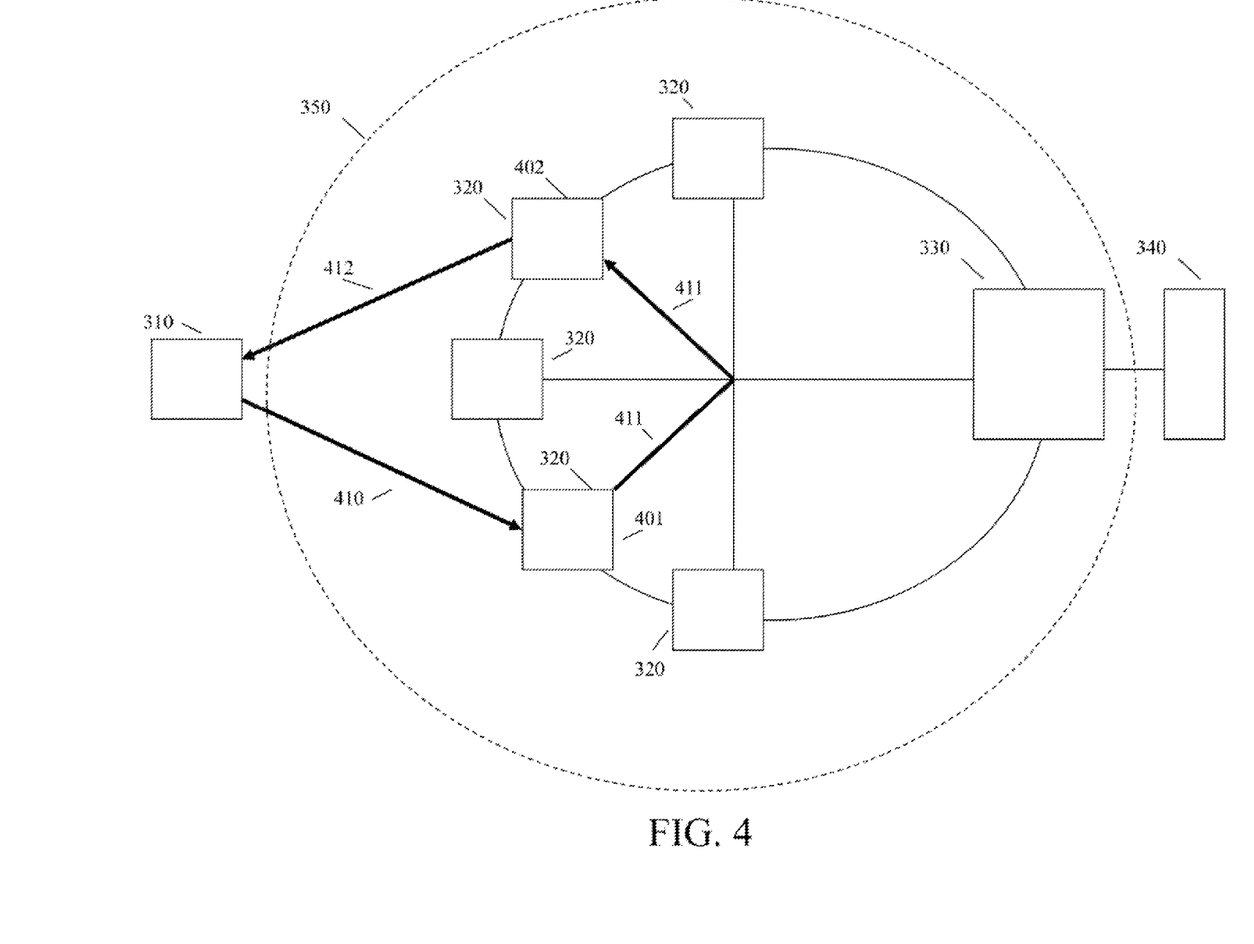
FIG. 4 is a simplified illustration of a method for establishing communications between a client and a multi-path network using the system of FIG. 3 in accordance with some embodiments of the disclosed subject matter.

Upon receiving a packet with the request, at 411, the second node 402 can select a session key Ku 521, for example, at random, and create a ticket 520 for a client 310. The client's public key certificate can be validated, and a second copy of Ku 521 can be independently encrypted under the client's public key. In some embodiments, both operations can be relatively lightweight (e.g., compared to operations involving RSA private keys); a node 320 can be able to perform, for example, a few thousand public key operations (i.e., signature verifications or public-key encryptions) per second. Upon creation, the ticket 520, along with the encrypted session key 521 can be sent to the client 310, at 412, encrypted in packet 530. This one-round-trip protocol can be stateless (for the network 350) and computationally fast, thus resisting both memory-exhaustion and CPU-exhaustion attacks on the nodes 320. Additionally, an optional message can be sent from the network 350 to the client 310 with a list of the nodes' 320 IP addresses. This list can be used by the client 310 to select a node 320 to send a packet to after authentication is complete.

To further inhibit an attack, such as a CPU-exhaustion attack, IP-spoofing attack, or memory-exhaustion attack another round trip can be added to the key establishment protocol. This can be done by, for example, having the client 310 send a UMAC-signed certificate before generating the ticket 520. In such a two-round trip protocol, illustrated in FIG. 6, a client 310 can send, at 610, a request and certificate to a node 320, such as node 601. Node 601, can forward, at 611, this request to a second node 320, such as node 602. Note 602 can treat the certificate as a random number, which it can UMAC-sign with the shared key, KM. The client's 310 IP address and the systems timestamp can be the nonce used in the UMAC operation. Node 602 can send, at 612, the UMAC signature and the nonce to client 310. To prove liveness (e.g., that the client can respond to communication), the client can contact a third node 320, such as node 603, and send, at 613, its certificate, the UMAC signature, and the nonce. Node 603 can validate the authenticity of the UMAC and forward, at 614, the request to a fourth node 320, such as node 604. Node 604 can generate a ticket for the client 310, encrypting it with the client's 310 public key, which can be retrieved from the certificate, and send, at 615, the client a packet 530.

In the example protocol described above, the ticket can have a flag indicating the authorization is not complete and thus does not provide full access to the network. The authentication protocol can continue to use the ticket, while flagged incomplete, to, for example, prove liveness for the network 350 and the client 310. When the authentication is complete, however, the network 350 can provide the client 310 with a ticket flagged complete and thus provide access that is not restricted. This can be accomplished, for example, by simply clearing the flag in the ticket. It should be noted that a ticket can be periodically or randomly refreshed to avoid situations where, for example, a malicious user distributes the session key and ticket to attackers (e.g., zombies) that try to access the network 350.

Any appropriate authentication process can be followed by additional authentication that can use, for example, a Graphic Turing Test (GTT) to discern the presence of a human at the client node. This can prevent legitimate nodes that have been subverted by an attacker from being used as entry points to the network 350. In some embodiments, GTT-based authentication can issue a second ticket that only allows clients 310 to contact the GTT server. Each node 320 can embody this server, for example, locally. Once the GTT authentication is successfully performed, the GTT server can issue an unrestricted ticket to a client 310. In should be noted that the GTT authentication can be performed at periodic or random intervals.

Figure 6:
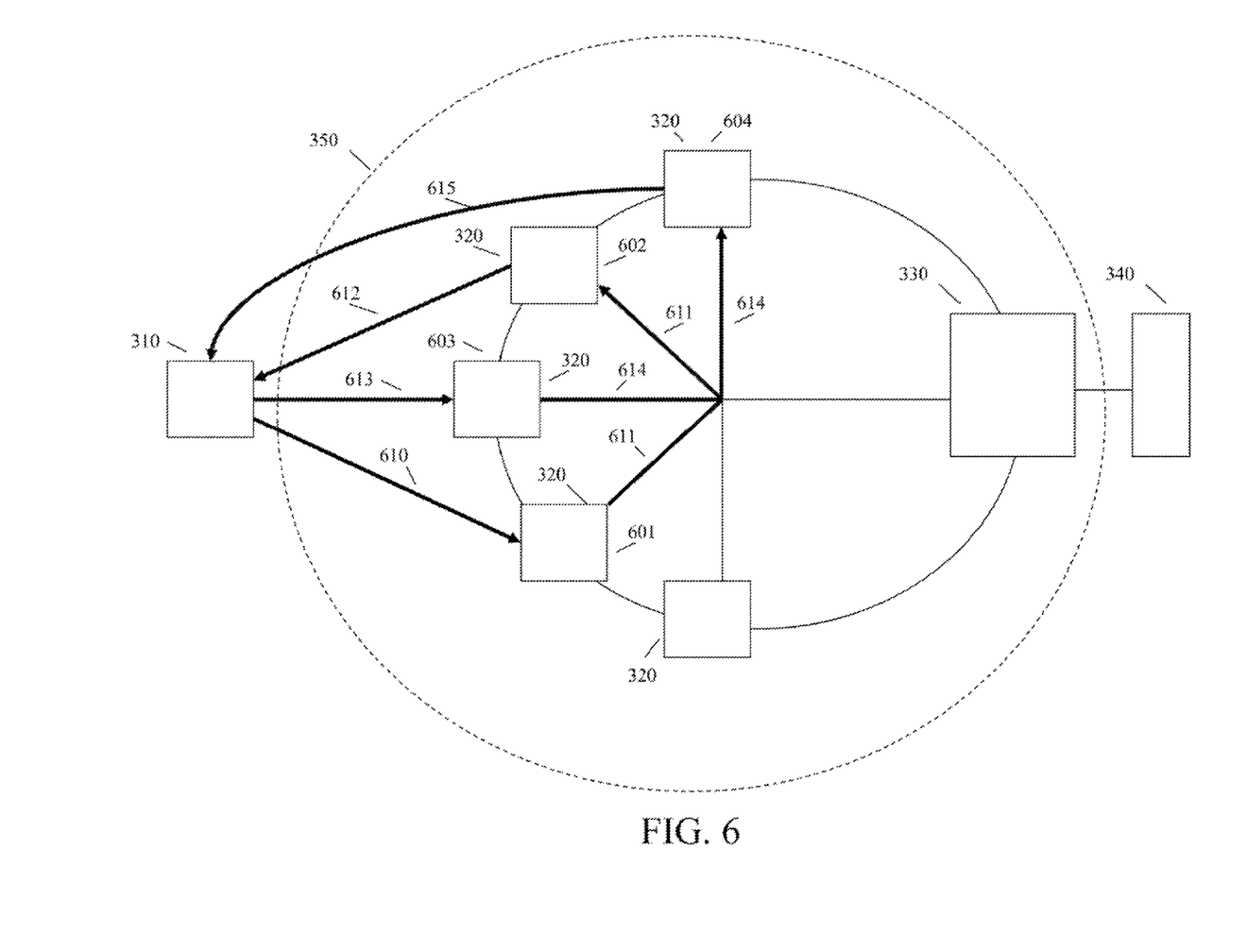
FIG. 6 is a simplified illustration of another process for establishing communications between a client and a multi-path network using the system of FIG. 3 in accordance with some embodiments of the disclosed subject matter.
Figure 7:
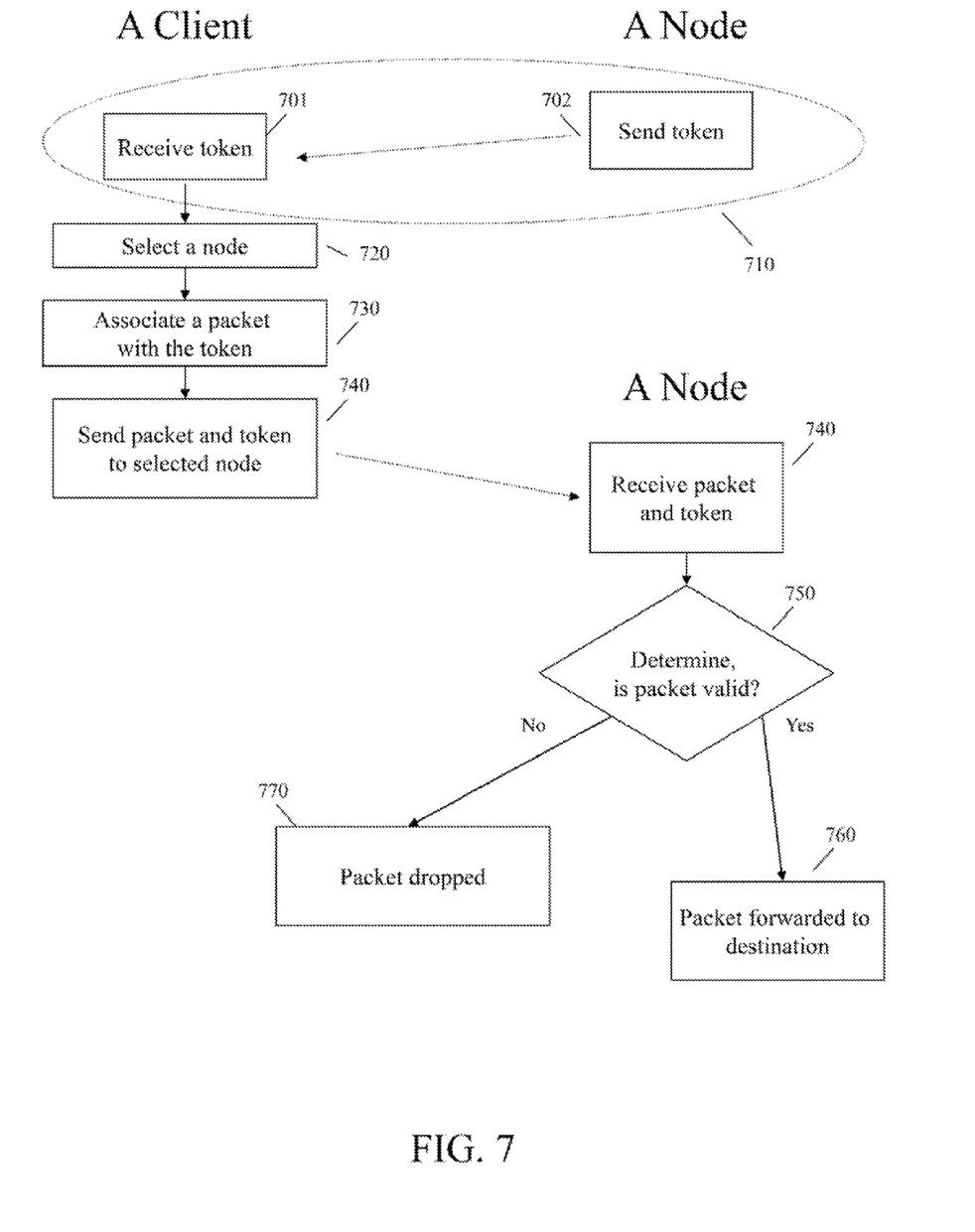
FIG. 7 is a schematic diagram of a communication process for sending packets from a client to server through a multi-path network in accordance with some embodiments of the disclosed subject matter.

As illustrated in FIG. 7, when a client 310 has completed, at 710, an authentication process (e.g. of FIG. 4 or FIG. 6) by, for example, receiving a token, at 701, sent from a node 320, at 702, the client 310 can start sending packets to the remote destination 340 through the network 350. The client 310 can spread these packets across the nodes 320 in the network 350. For each packet, the client 310 can select, at 720, a node 320 to send that packet through. It should be noted that the selection, at 720, can be made from a list of nodes 320 that is kept at a client 310 and can be updated depending on the version 513 of the list held by the client 310. Client 310 can also provide a measure of security to the packet, at 730, by for example, attaching authentication information to the packet. The packet can be sent, at 740, to a selected node 320 where it can be checked, at 750, for authenticity. If the node 320 performing the checking confirms the authenticity of the packet, the packet can then be forwarded, at 760, to either its destination 340 or a server 330 that knows the location of, and will forward the packet to, its destination 340. If the node determines this packet is not authentic or otherwise should not be forwarded, the packet can be dropped or otherwise discarded, at 770.

It should be noted that the spreading process, starting in some embodiments at 720, can be repeated for each packet a client 310 sends to a destination 340. For example, a client 310 can send a first packet to first node 320, a second packet to a second node 320, and a third packet to a third node 320.

It should also be noted that the packets can be associated with each other. For example, packets can be associated because they are sent from the same client 310, they are sent with the same ticket 520, they are sent from the same application, and/or they are sent from the same network interface device. In addition, in some embodiments, it is possible that a token can be issued not only to a client, but also, for example, to an application or network interface device.

In some embodiments, once a client 310 has received a session key 521 and an unrestricted ticket 520, such as at 412 or 615, access by that client is considered authenticated, at 710, and the client 310 can start sending packets to the remote destination 340 through the network 350. Each packet, such as the example packet 540 of FIG. 5, sent by a client 310 to a node 320 can contain, for example, three network-related fields. These fields can be the ticket 520, an authenticator 543, and a sequence ID 541 that is, for example, monotonically increasing. Packet 540 can also contain the information to be passed on to server 740, such as, for example, IP packet 544. As discussed above, the ticket 520 can contain a session key 521 and a sequence range 522 for which the ticket is valid, each of which can be encrypted under a secret key, KM.

The sequence number 541 can be a value that is incremented by a client 310 for each packet transmitted through the network 350 with a given session key 521. Each node 320 can maintain a table of last-seen sequence numbers 541 for each client 310. The client identifier, at 523 in ticket 520, can be used as an index to this table.

The authenticator 543 can be a message authentication code (MAC) using, for example, a fast transform such as UMAC and the session key Ku. The UMAC can be computed over the whole packet, including the ticket and the sequence number 541 of the packet. The sequence number 541 concatenated with the client's IP address, for example, can be used as the UMAC nonce. Doing so can bind the ticket to a specific IP address (or other location identifier) and thus prevent the ticket 520 from being used by other clients 310.

It should be noted that, in some embodiments, the only state each node 320 needs to maintain per client 310 is the client identifier and the last sequence number seen by that particular client 310. This state is not network or application related and can be used to prevent replay attacks (e.g., inappropriately using an already used token to gain access). For example, assuming that both the client identifier and the sequence number are 32-bit values, each would need to maintain only 64 bits of state for each client. Thus, for a network 350 that supports one million active clients 310, only 8 MB of state information is needed.

A client 310 transmitting a packet through the network 350 can use the session key 521 and the sequence number 541 as inputs to a pseudo-random function (PRF) to select, at 720, which node 320 will be sent a packet. The output of the PRF can be treated as an index to a list of the nodes 320, through which the packet will be routed. There are various ways a client 310 can obtain the list of nodes 320. For example, the list can be obtained when the client first connects to the network by requesting it after the key establishment phase. Additionally, it can be obtained independently of the protected communication. A client 310 can keep an updated list of the nodes 320 by, for example, comparing the version 513 of its list with a version stored in the network 350 and download only the differences between the two versions. It should be noted that updating this list may be necessary, or beneficial for performance, when a node goes down to have, for example, maintenance performed.

As discussed above, a client 310 can associate a packet with authentication information, at 730. For example, the client can encapsulate the original packet (i.e., the packet addressed to the final destination) inside a packet for the network 350, along with the information identified above (e.g., ticket, sequence number, and authenticator). This packet can be forwarded through the network 350 to the final destination 340 or, alternatively, to an appropriate secret servlet on server 330 and then to the final destination 340.

Upon reception of a packet, at 740, the network 350 can check the validity, at 750, of the packet, by, for example, checking the validity of the ticket 520. This validation can be accomplished, for example, using UMAC validation. After validating the authenticity of the ticket, the ticket can be decrypted and the authenticator can be verified at 750. This can inhibit spoofing attacks from an attacker who obtains a valid ticket and generates packets to all nodes with randomly selected sequence numbers, thus preventing a valid client 310 from communicating with the network 350. Furthermore, to detect any replay attacks, a node 320 that receives such a packet can verify that the sequence number on the packet is larger than the last sequence number seen from a client 310 by using the client identifier to index an internal table. A node 320 can also verify that the sequence number is within the acceptable range of sequence numbers for this ticket and can use the key and the sequence number along with the PRF to determine whether the client 310 correctly routed the traffic. If all tests are successful, a node 320 can update the sequence number table and forward the packet, at 760, to, for example, a secret servlet at server 330. A packet that is not successfully authenticated, at 750, can be dropped or otherwise discarded, at 770. For example, packets with lower or equal sequence numbers than a previously seen sequence number can be considered duplicates (either accidental reordering or malicious replays by attackers) and thus dropped, at 770.

To avoid reuse of the same ticket, for example, by multiple DoS zombies, the range 522 of valid sequence numbers 541 for the ticket 520 can be kept relatively small (and contained inside the ticket), e.g., 500 packets. Moreover, the ticket 520 can be bound to the client's IP address, since, to authenticate the packet, the overlay can use the UMAC including the client's IP address as part of the UMAC nonce. In addition, each packet can contain a timestamp that can be checked to further confirm that the ticket 520 is valid. After a configurable period of time (e.g., 1 or 2 hours), the network can expire the ticket. Nodes 320 that receive valid tickets that are about to expire can simply re-issue a new ticket 520 with the same session key 521 but a new range 522 of valid sequence numbers 541. This approach, combined with the state kept by each node 320, can make it prohibitive for attackers to reuse the same ticket 520 from a large number of distinct nodes (each of which is only transmitting to a specific node), since the new valid ticket 520 would need to be continuously propagated to all zombies. A shared key under which the ticket can be encrypted can be periodically or otherwise established among all nodes 320, using, for example, a group key management protocol.

Some embodiments of the systems and methods of the disclosed subject matter can be implemented in computer code on nodes 320, a server 330, a server 340, and/or a client 310. For example, a routing-table entry on client 310 can redirect IP packets destined for a server 340 to a virtual interface implemented using the a pseudo-device driver (e.g., TUN, a virtual point-to-point network device known in the art). This virtual interface can act as a virtual network interface that intercepts messages to and from a real network interface. An IP packet, for example, sent to the virtual interface can be read by a user process reading the device (e.g., reading/dev/tun0). Similarly, if the process writes a complete IP packet to /dev/tun0, this can appear in an IP input queue (e.g., the input queue of the kernel) as if it was coming from the network interface tun0. In this case, whenever an application on a client 310 attempts to access a protected server 340, the outgoing traffic can be intercepted by the virtual interface. A user-level proxy daemon process reading from the corresponding device can capture each outgoing IP packet, encapsulate it, at 730, in a UDP packet along with the authentication information, select, at 740, a node 320, and send the UDP packet to the selected node 320.

Software running on a node 320 can receive such a UDP packet, authenticate it, at 750, and forward it, at 760, to the a server 340 or 330. Here, the UDP packet can be decapsulated and delivered to its intended recipient (e.g., a web server). The decapsulation can be performed by a separate server (e.g., server 330) or by the server where the intended recipient is located (e.g., server 340).

Some embodiments of connection establishment, as illustrated, for example in FIG. 4 or FIG. 6, can be implemented in software and/or hardware. When a client 310 attempts to contact a protected server 340 for the first time it can receive a small list of randomly selected nodes' 320 IP addresses through DNS name resolution. A client 310 can select one of the nodes, such as node 401, and transmit, at 410, a connection initiation packet, such as, packet 510 of FIG. 5, to authenticate itself, acquire a ticket 520 and a session key 501, and to update its list of nodes 320. The connection request packet 510 can be a UDP packet sent to a known port and it can contain a version number 503 of the list of overlay nodes' IP addresses. As discussed above in connection with FIG. 4, when a node 320 receives this packet, it can forward it, at 411, to another node 320, such as node 402.

Node 402 can generate a ticket, such as 36 byte (288-bit) ticket 520. The first 224 bits of the ticket can include a 128-bit session key Ku 521, a 64-bit packet sequence range 522 for which the ticket is valid with the starting sequence randomly selected, and a 64-bit field 523 with the Client ID, time-stamp and flags that can be used to avoid public-key dictionary attacks. This field 523 can be AES-encrypted using a master key, KM, shared among nodes 320. A 32-bit UMAC 524 authenticator can be appended and computed over all fields in the ticket using the master key KM. The ticket 520, a starting packet sequence, and the session key Ku 521 (encrypted under the client's public key) can be sent to a client 310. Another optional packet containing differences of the current list of the IP addresses of the nodes 320 can also be sent to the client 310, depending on the version 513 indicated in the connection initiation packet 510.

Some embodiments of packet transmission, as illustrated in FIG. 7, can be implemented in software and/or hardware. After completing connection establishment, as described above, a client 310 can construct a forward request UDP packet containing the packet sequence number 541, a ticket 520, and the original packet 544, the client 310 can determine which node 320 to send a packet to by using the session key 521, the packet sequence 522 (start sequence plus one for the first packet) and the publicly available sorted list of IP addresses of the nodes 320. Assuming that the number of overlay nodes is n, the client can compute the index in the sorted list of IPs as:

index=UMAC(Ku⊕ sequence number) (mod(n)).

The receiving node 320 can validate the ticket 520 using a ticket UMAC. The ticket 520 can be decrypted using KM, a secret key shared among the nodes 320, and the packet authenticity can be verified. The sequence number 541 can be compared against the one stored in the receiving node 320 for this client identifier, if there is one (otherwise, this can be assumed to be a packet from a new client). If the sequence number 541 in the packet 540 is bigger, the node 320 can store a new sequence number and check if the ticket 520 is expired (i.e., the packet sequence is greater than the maximum packet sequence), after decrypting the ticket 520. By computing the index as above, a node 320 can check whether the packet 540 was correctly routed to it. If a check fails, at 750, the packet 540 (or packet 544 if un-encapsulated) can be dropped at 770. Otherwise, the packet can be routed, at 760, for example, to a secret servlet on server 330, and from there to the actual server 340.

Although the invention has been described and illustrated in the foregoing illustrative embodiments, it is understood that the present disclosure has been made only by way of example, and that numerous changes in the details of implementation of the invention can be made without departing from the spirit and scope of the invention. The disclosed subject matter can be used to prevent attacks in addition to the illustrative example attacks described above. For example, some embodiments can be used to prevent an attacker from successfully spying on information transmitted from a client 320 to a server 340. In this case, spreading of packets among various nodes 320, according to systems and method of the disclosed subject matter, can result in an attacker obtaining an insufficient percentage of the transmitted packets to be dangerous to a client 320. It should be noted that features of the disclosed embodiments can be combined and rearranged in various ways.

What is claimed is:

1. A method for establishing access to a computer network, comprising:

receiving, using a first hardware processor of a first node in the computer network, a first request from a first client device for access to the computer network;

selecting, using the first hardware processor, a second node in the computer network;

forwarding, using the first hardware processor, the first request to the second node;

selecting, using a second hardware processor of the second node, a first session key;

creating, using the second hardware processor, a first ticket for the first client device that includes the first session key;

forwarding, using the second hardware processor of the second node, the first ticket to the first client device;

receiving, using the first hardware processor, a first packet that includes the first ticket from the first client device;

determining, using the first hardware processor, that the first packet is valid based at least in part on the first ticket;

in response to determining that the first packet is valid, forwarding the first packet to another node in the computer network;

receiving, using a third hardware processor of a third node in the computer network, a second request from a second client device for access to the computer network;

selecting, using the third hardware processor, a fourth node in the computer network;
forwarding, using the third hardware processor, the second request to the fourth node;
selecting, using a fourth hardware processor of the fourth node, a second session key;
creating, using the fourth hardware processor, a second ticket for the second client device that includes the second session key;
forwarding, using the fourth hardware processor of the fourth node, the second ticket to the second client device;
receiving, using the second hardware processor, a second packet that includes the second ticket from the second client device;
determining, using the second hardware processor, that the second packet is valid based at least in part on the second ticket; and
in response to determining that the second packet is valid, forwarding the second packet to yet another node in the computer network.

2. The method of claim 1, further comprising selecting the second node to forward the first request to randomly from a plurality of nodes of the computer network.

3. The method of claim 1, further comprising encrypting at least the first session key using a secret key negotiated among a plurality of nodes of the computer network.

4. The method of claim 3, further comprising:
encrypting a copy of the first session key using a public key associated with the first client device; and
forwarding the encrypted copy of the first session key to the first client device.

5. The method of claim 3, further comprising selecting a client identifier for the first client device, wherein the first ticket includes the client identifier.

6. The method of claim 3, further comprising calculating a universal hashing signature using the secret key and a nonce, wherein the first ticket includes the universal hashing signature.

7. A system for establishing access to a computer network, comprising:
a first hardware processor of a first node in the computer network that is programmed to:
receive a first request from a first client device for access to the computer network;
select a second node in the computer network;
forward the first request to the second node;
receive a first packet that includes a first ticket from the first client device;
determine that the first packet is valid based at least in part on the first ticket;
in response to determining that the first packet is valid, forward the first packet to another node in the computer network;
a second hardware processor of the second node that is programmed to:
select a first session key;
create the first ticket for the first client device that includes the first session key;
forward the first ticket to the first client device;
receive a second packet that includes a second ticket from the second client device;
determine that the second packet is valid based at least in part on the second ticket; and
in response to determining that the second packet is valid, forward the second packet to yet another node in the computer network;
a third hardware processor of a third node in the computer network that is programmed to:
receive a second request from a second client device for access to the computer network;
select a fourth node in the computer network;
forward the second request to the fourth node; and
a fourth hardware processor of the fourth node that is programmed to:
select a second session key;
create the second ticket for the second client device that includes the second session key;
forward the second ticket to the second client device.

8. The system of claim 7, wherein the first hardware processor is further programmed to select the second node to forward the first request to randomly from a plurality of nodes of the computer network.

9. The system of claim 7, wherein the second hardware processor is further programmed to encrypt at least the first session key using a secret key negotiated among a plurality of nodes of the computer network.

10. The system of claim 9, wherein the second hardware processor is further programmed to:
encrypt a copy of the first session key using a public key associated with the first client device; and
forward the encrypted copy of the first session key to the first client device.

11. The system of claim 9, wherein the second hardware processor is further programmed to select a client identifier for the first client device, wherein the first ticket includes the client identifier.

12. The system of claim 9, wherein the second hardware processor is further programmed to calculate a universal hashing signature using the secret key and a nonce, wherein the first ticket includes the universal hashing signature.

13. A non-transitory computer-readable medium containing computer executable instructions that, when executed by at least one processor, cause the at least one processor to perform a method of establishing access to a computer network, comprising:
receiving, at a first node in the computer network, a first request from a first client device for access to the computer network;
selecting, using the first node, a second node in the computer network;
forwarding the first request to the second node;
selecting, using the second node, a first session key;
creating, using second node, a first ticket for the first client device that includes the first session key;
forwarding the first ticket to the first client device;
receiving, at the first node, a first packet that includes the first ticket from the first client device;
determining, using the first node, that the first packet is valid based at least in part on the first ticket;
in response to determining that the first packet is valid, forwarding the first packet to another node in the computer network;
receiving, at a third node in the computer network, a second request from a second client device for access to the computer network;
selecting, using the third node, a fourth node in the computer network;
forwarding the second request to the fourth node;
selecting, using the fourth node, a second session key;
creating, using the fourth node, a second ticket for the second client device that includes the second session key;
forwarding the second ticket to the second client device;

receiving, at the second node, a second packet that includes the second ticket from the second client device;

determining, using the second node, that the second packet is valid based at least in part on the second ticket; and in response to determining that the second packet is valid, forwarding the second packet to yet another node in the computer network.

14. The non-transitory computer-readable medium of claim 13, wherein the method further comprises selecting the second node to forward the first request to randomly from a plurality of nodes of the computer network.

15. The non-transitory computer-readable medium of claim 13, wherein the method further comprises encrypting at least the first session key using a secret key negotiated among a plurality of nodes of the computer network.

16. The non-transitory computer-readable medium of claim 15, wherein the method further comprises:

encrypting a copy of the first session key using a public key associated with the first client device; and forwarding the encrypted copy of the first session key to the first client device.

17. The non-transitory computer-readable medium of claim 15, further comprising selecting a client identifier for the first client device, wherein the first ticket includes the client identifier.

18. The non-transitory computer-readable medium of claim 15, further comprising calculating a universal hashing signature using the secret key and a nonce, wherein the first ticket includes the universal hashing signature.

* * * * *